United States Patent
Kovach et al.

[11] 3,841,720
[45] Oct. 15, 1974

[54] THRUST BEARING ASSEMBLY

[75] Inventors: James T. Kovach, Dearborn Heights; Antoni Paluszny, Ann Arbor, both of Mich.

[73] Assignee: Ford Motor Company, Dearborn, Mich.

[22] Filed: Apr. 2, 1973

[21] Appl. No.: 347,268

[52] U.S. Cl. .................................................. 308/9
[51] Int. Cl. ........................................... F16c 17/16
[58] Field of Search .................... 308/160, 9, 168

[56] References Cited
UNITED STATES PATENTS
3,376,083   4/1968   Muijderman ........................ 308/9
3,380,040   4/1968   Liggett et al ........................ 308/9

Primary Examiner—Charles J. Myhre
Assistant Examiner—Frank Susko
Attorney, Agent, or Firm—Roger E. Erickson; Keith L. Zerschling

[57] ABSTRACT

A thrust bearing assembly having a first spirally grooved bearing face engaging a second ungrooved face. Lubricant is delivered under pressure to an annular groove circumscribing the spiral grooves. A portion of the lubricant is drawn into the spiral grooves to provide a hybrid hydrostatic and hydrodynamic bearing.

7 Claims, 3 Drawing Figures

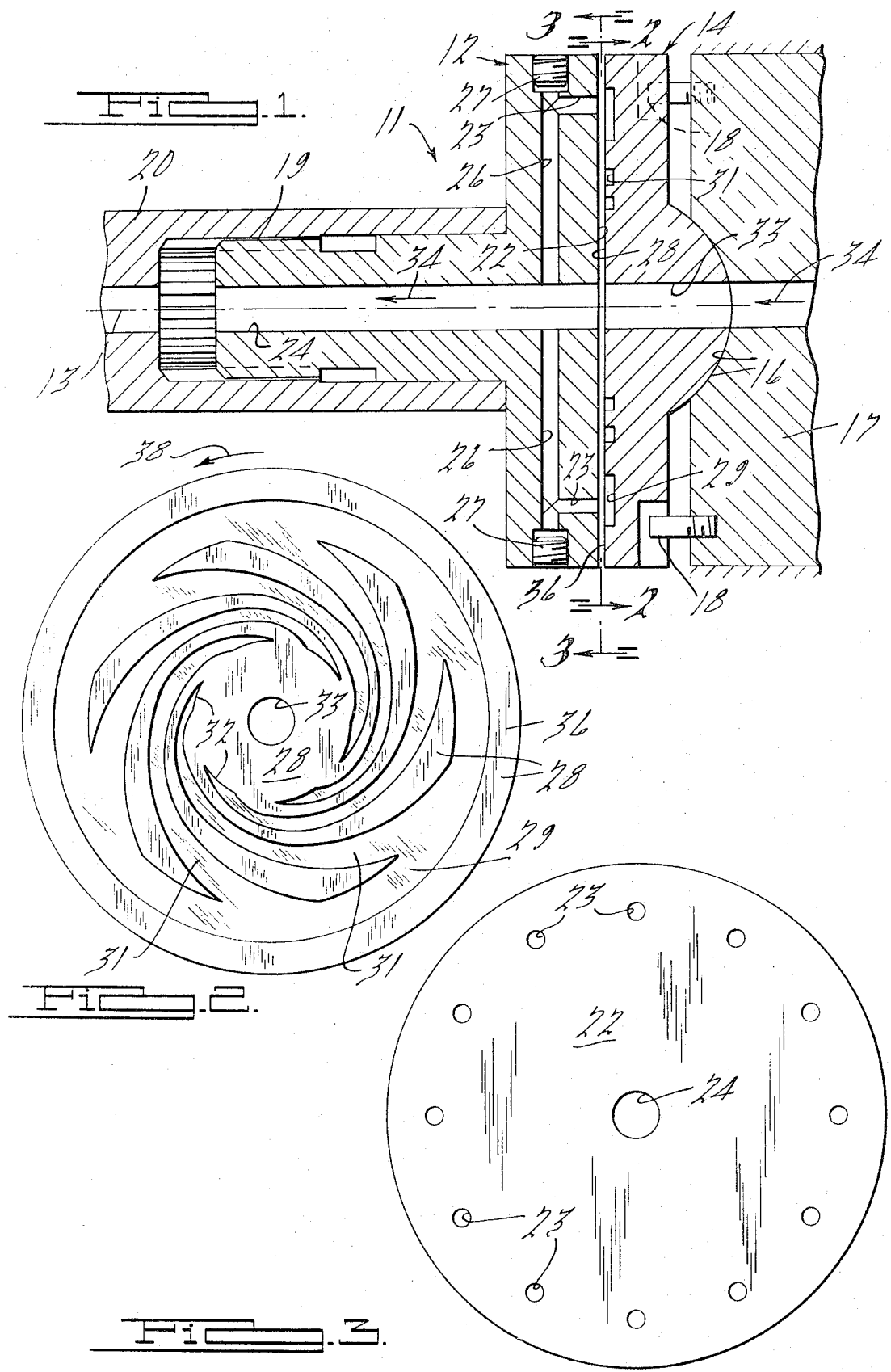

3,841,720

THRUST BEARING ASSEMBLY

BACKGROUND AND SUMMARY OF THE INVENTION

The pumping effect of a pair of relatively rotating surfaces, one of which is formed with a recurrent pattern of curved grooves, is known in the art and is described in a book entitled "Spiral Groove Bearings" by E. A. Muijderman, Philips Technical Library, Springer-Verlag, New York Inc. (1966).

This invention builds upon these known principles to provide a thrust bearing assembly suitable for use on a gas turbine rotor. The invention further provides a thrust bearing construction which for a given diameter of bearing surface provides increased load capacity over presently known hydrodynamic thrust bearings. In addition, the invention provides a thrust bearing experiencing a reduced power loss for a given load capacity. The invention also provides a thrust bearing assembly having combined hydrodynamic and hydrostatic properties. Still further, the invention provides a thrust bearing assembly suitable for use with a gas turbine rotor which is economical to produce and reliable in operation.

A thrust bearing assembly constructed in accordance with this invention includes relatively rotatable first and second members having slidingly engageable bearing faces. One of the bearing surfaces has a generally annular groove circumscribing a plurality of curved grooves which extend inwardly from the annular groove and which terminate at locations radially spaced from the axis of rotation of the rotatable bearing member. One or more ports opens into the annular groove and supply a viscous fluid to lubricate the bearing surfaces.

BRIEF DESCRIPTION OF THE DRAWINGS

FIG. 1 shows an axial cross section of a bearing assembly constructed in accordance to the invention.

FIG. 2 is a cross sectional view taken along the line 2—2 of FIG. 1.

FIG. 3 is an elevational view taken along line 3—3 of FIG. 1.

DETAILED DESCRIPTION OF A PREFERRED EMBODIMENT

Reference numeral 11 of FIG. 1 refers to a thrust bearing assembly comprising two principal components. The first component is thrust collar member 12 which is rotatable about a given axis 13. The second component is non-rotatable bearing member 14. In the preferred embodiment of bearing assembly 11 included is a spherical interface 16 between the member 14 and rear stationary member 17. The spherical interface 16 provides an alignment means to accommodate for slight angular misalignment between the members 12 and 14 and to assure that the contiguous portions of the members 12 and 14 are flat against each other. The non-rotatable member 14 is connected to the stationary member 17 by pin and groove means 18 which permit the limited movement of the non-rotatable member about the center of the spherical interface but prevent its rotation about axis 13.

The rotatable member 12 has a T-shaped cross section, as shown in FIG. 1, and is connected by a threaded connection 19 to a rotary machine component 20 such as a turbine rotor component. The bearing face of member 12 contiguous to non-rotatable member 14 is a generally circular plane surface having a plurality of ports 23 spaced at a given radial distance from axis 13. The ports are connected to an axial bore 24 by drilled passages 26. Plugs 27 close the radially outer ends of passages 26.

The non-rotatable member 14 has a generally circular plane bearing face 28 of a diameter approximately equal to that of the member 12. An annular groove 29 is formed in the bearing surface 28 spaced radially inwardly from the circumference as illustrated in FIGS. 1 and 2. Extending inwardly from groove 29 are a plurality of curved grooves 31. When the bearing surfaces 22 and 28 are flat, the sides of the curved grooves are logarithmic spirals. The curved grooves 31 terminate at a radius 32 spaced from axis 13 and from axial bore 33 which is a continuation of bore 24 through members 14 and 17.

As may be seen in FIG. 1 of the drawings, the ports 23 are positioned so that they discharge into annular groove 29 of member 14.

A typical groove depth for a thrust load of 500 lbs. at 35,000 RPM and a bearing surface diameter of 1.75 in. would be .001 in. To reduce thermal distortions the member 14 is preferably of a material having low thermal expansion properties such as Invar.

It is not necessary that the bearing surfaces be flat as are surfaces 22 and 28. Conical and spherical shapes may be used if for some reasons those shapes are preferred.

OPERATION OF THE PREFERRED EMBODIMENT

A fluid lubricant such as oil is provided under pressure through axial bores 24 and 33 flowing in the direction of the arrows 34 of FIG. 1. A portion of the lubricant passes into radially extending passages 26 and undergoes a pressure increase as a result of the centrifugal pumping action of the rotating thrust collar member 12. Thus, lubricant is discharged from ports 23 at an increased pressure over that of the pressure within the axial bores 24 and 33.

A portion of the lubricant oil received within annular groove 29 from ports 23 passes radially outwardly as a film between the radially outermost portion 36 of bearing surface 28 and the corresponding annular portion of bearing surface 22. Another portion of the lubricant is drawn into the curved grooves 31 by the pumping action resulting from relative rotation of surfaces 22 and 28 in the direction of the arrow 38 of FIG. 2. This pumping action causes a further increase in the lubricant pressure within the grooved region to separate and lubricate the bearing surfaces 22 and 28. Lubricant within grooves 31 passes radially inwardly as a film and returns to the axial lubricant bore 33.

It may be seen that the pressure of the lubricant film between the bearing surfaces results from both the hydrostatic or feed pressure of the lubricant and the hydrodynamic or pumping action provided by the relative rotation between the bearing surfaces. The pressure of the lubricating fluid within bores 24 and 33 also act to retard or to reduce the radially inward flow of fluid between the bearing surfaces thereby increasing the pressure in the lubricant film and correspondingly increasing the load capacity of the bearing.

Modification and alterations may occur to those skilled in the art which are included within the scope of the following claims.

We claim:

1. A thrust bearing assembly comprising:
a first member rotatable about a given axis and having a first bearing surface,
a second member being non-rotatable about said given axis and having a second bearing surface slidingly engageable with said first bearing surface,
an annular groove formed in said second bearing surface spaced radially inwardly from the outer periphery thereof,
a plurality of curved grooves formed in said second bearing surface extending inwardly from said annular groove and terminating on said second bearing surface at locations radially spaced from said given axis,
one or more ports opening on said first bearing surface into said annular groove,
said first member having means to supply a viscous fluid lubricant to said one or more ports for discharge into said annular groove.

2. A thrust bearing assembly according to claim 1,
said first and second members including first passage means extending along said given axis,
second passage means formed in said first member interconnecting each said port with said first passage means.

3. A thrust bearing assembly according to claim 1,
said second member including a first spherical surface on a side opposite the second bearing surfaces,
a third non-rotatable member having a second spherical surface mutually engageable with said first spherical surface,
each said spherical surface having its center located on said given axis,
said second members being movable relative to said third member about the center of said spherical surfaces to permit said second bearing surface to align with said first bearing surface.

4. A thrust bearing assembly according to claim 2,
said one or more ports being spaced radially inwardly from the outer periphery of said first member and radially outwardly from said first passage means.

5. A thrust bearing assembly according to claim 2,
means to provide a viscous fluid under pressure to said second passage means.

6. A thrust bearing assembly according to claim 2,
said first passage means comprising a bore having an axis colinear with said given axis,
said curved grooves terminating on said second bearing surface at locations spaced from said bore.

7. A thrust bearing assembly according to claim 3,
means interconnecting said second member and said third member to prevent rotation of said second member relative to said third member about said given axis.

* * * * *